United States Patent
Chatterjee et al.

(10) Patent No.: US 7,640,242 B2
(45) Date of Patent: *Dec. 29, 2009

(54) LIGHT WEIGHT LOCKING MODEL IN THE DATABASE FOR SUPPORTING LONG DURATION TRANSACTIONS

(75) Inventors: Raja Chatterjee, Nashua, NH (US); Siva Ravada, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 11/388,310

(22) Filed: Mar. 24, 2006

(65) Prior Publication Data

US 2007/0226218 A1 Sep. 27, 2007

(51) Int. Cl.
*G06F 17/30* (2006.01)
(52) U.S. Cl. .................. 707/8; 707/200; 707/202; 707/10
(58) Field of Classification Search .............. 707/1–3, 707/8, 10, 200, 201, 203; 711/168
See application file for complete search history.

(56) References Cited

U.S. PATENT DOCUMENTS

| | | | | |
|---|---|---|---|---|
| 5,261,069 A | * | 11/1993 | Wilkinson et al. | 711/145 |
| 5,524,241 A | * | 6/1996 | Ghoneimy et al. | 707/10 |
| 5,809,503 A | * | 9/1998 | Aoshima | 707/8 |
| 5,983,225 A | * | 11/1999 | Anfindsen | 707/8 |
| 6,275,863 B1 | * | 8/2001 | Leff et al. | 709/248 |
| 2005/0134902 A1 | * | 6/2005 | Mihira et al. | 358/1.15 |
| 2006/0123003 A1 | * | 6/2006 | Lightstone et al. | 707/8 |

* cited by examiner

*Primary Examiner*—Cam-Linh Nguyen

(57) ABSTRACT

A method for maintaining a long transaction database lock across multiple database sessions. It is determined if at least one row of a long transaction lock enabled table, identified in a long transaction lock request, is locked by a short or long transaction lock. If the row is not locked, locking the at least one row with a long transaction lock. The long transaction lock on the at least one row is associated with a current client session that generated the request. The long transaction lock can be transferred to another client session in response to a lock transfer request from the another client session.

27 Claims, 9 Drawing Sheets

LIGHT WEIGHT LOCKING MODEL IN THE DATABASE FOR SUPPORTING LONG DURATION TRANSACTIONS

CROSS-REFERENCE TO RELATED APPLICATIONS

This application is related to U.S. patent application Ser. No. 11/388,308, filed on Mar. 24, 2006, the disclosure of which is incorporated herein by reference in its entirety.

BACKGROUND OF THE INVENTION

1. Field

The disclosed embodiments generally relate to relational database systems, and in particular to exclusive locks on rows of a database that span, and are transferable, across database session boundaries.

2. Brief Description of Related Developments

A relational or other object-relational database system stores the state of an instance or entity in a row of a table. The data in the rows can be changed via database manipulation commands. These data manipulation commands generally comprise short transactions, and can include for example insert/update/delete transactions. The short transaction database manipulation command will be followed by a terminal rollback or commit. The short transaction span is always within the bounds of a database session and can never span across database sessions.

Certain industry segments, such as for example, land information management, utilities management, hydrographic and aeronautical charting, and concurrent or collaborative engineering, require long transactions. A long transaction generally comprises a set of database manipulation commands that can span across the boundary of one or more database sessions. The changes made during the course of a long transaction can be made externally visible from time to time by explicitly committing the changes made. This is in essence, a sequence or series of short transactions.

For example, in many geographic information service ("GIS") applications, there is a need for a user to hold on to, or maintain control of a row for a period of time. Data updates or edits in these systems can take hours, days or months. Thus, these long transaction updates can span across multiple sessions and even database shutdowns. During the time that the user controls the row, no other user should be able to implement any changes to the row, or even delete the row. As the user makes changes to the row, the changes can be made available to others for viewing, but not for updating. Eventually, the user will relinquish the hold on the row, at which point another user can access the data.

Database locking mechanisms, as the term is commonly understood, are not sufficient for long transactions. In some applications, it can be desirable to perform database update operations consistently over multiple database transactions spanning across multiple database sessions. The current short transaction locks cannot allow this type of functionality to be achieved. Long transaction management has generally included versioning. The updates/changes are persisted for long periods of time and stored in the database as different revision sets. When a user initiates a transaction, a new version of the data is created, while a copy of the old data is maintained. The results of the long transaction are stored persistently.

For example, the Oracle Workspace Manager (OWM) can solve project collaboration requirements through versioning of database rows/instances. OWM stores workspace/version related metadata and other information to maintain concurrency and consistency. However, this version related information is not relevant for locking purposes. The database can hold different versions of the same record in revision sets. Feature instances can be locked in a specific revision set and are intended to eliminate conflicts between parent and child revision sets. However, the locking provided by OWM is either database session based or workspace based. There is no way to associate and propagate a short transaction lock across database sessions.

It would be advantageous to enable a light-weight locking model in a database that provides a simple, high-performance solution that lets a user hold on to an exclusive update lock on selected rows of a database table for extended periods of time, that spans and is transferable, across short transaction boundaries and session boundaries.

SUMMARY

The aspects of the disclosed embodiments are directed to maintaining a long transaction database lock across multiple database sessions. In one aspect, the method comprises determining if at least one row of a long transaction lock enabled table, identified in a long transaction lock request, is locked by a short or long transaction lock. If the row is not locked, locking the at least one row with a long transaction lock. The long transaction lock on the at least one row is associated with a current client session that generated the request. The long transaction lock can be transferred to another client session in response to a lock transfer request from the another client session.

In another aspect, the disclosed embodiments are directed to transferring a long transaction database lock across multiple database sessions. In one embodiment, the method comprises generating a long transaction lock row request for a transfer of a lock from a first session to the second session. It is determined if there is a short transaction lock on a row of the long transaction lock row request in the first session. If not, the long transaction lock is transferred from the first session to the second session if the second session is authorized to receive the long transaction lock.

In a further aspect, the disclosed embodiments are directed to a lock control method in a database system. In one embodiment, the method includes registering a table for enabling long duration transaction locks and associating all rows in a lock rows request from a database session where the transaction is to be performed with a token identifier. The token identifier is associated with the database session to identify the database session as owner of a long transaction lock of the rows. The rows associated with the lock rows request are locked if the rows are not already locked by another database session. The transaction is allowed to be executed on the locked rows only by a session associated with the token identifier.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE PREFERRED EMBODIMENT(S)

Figure 1:
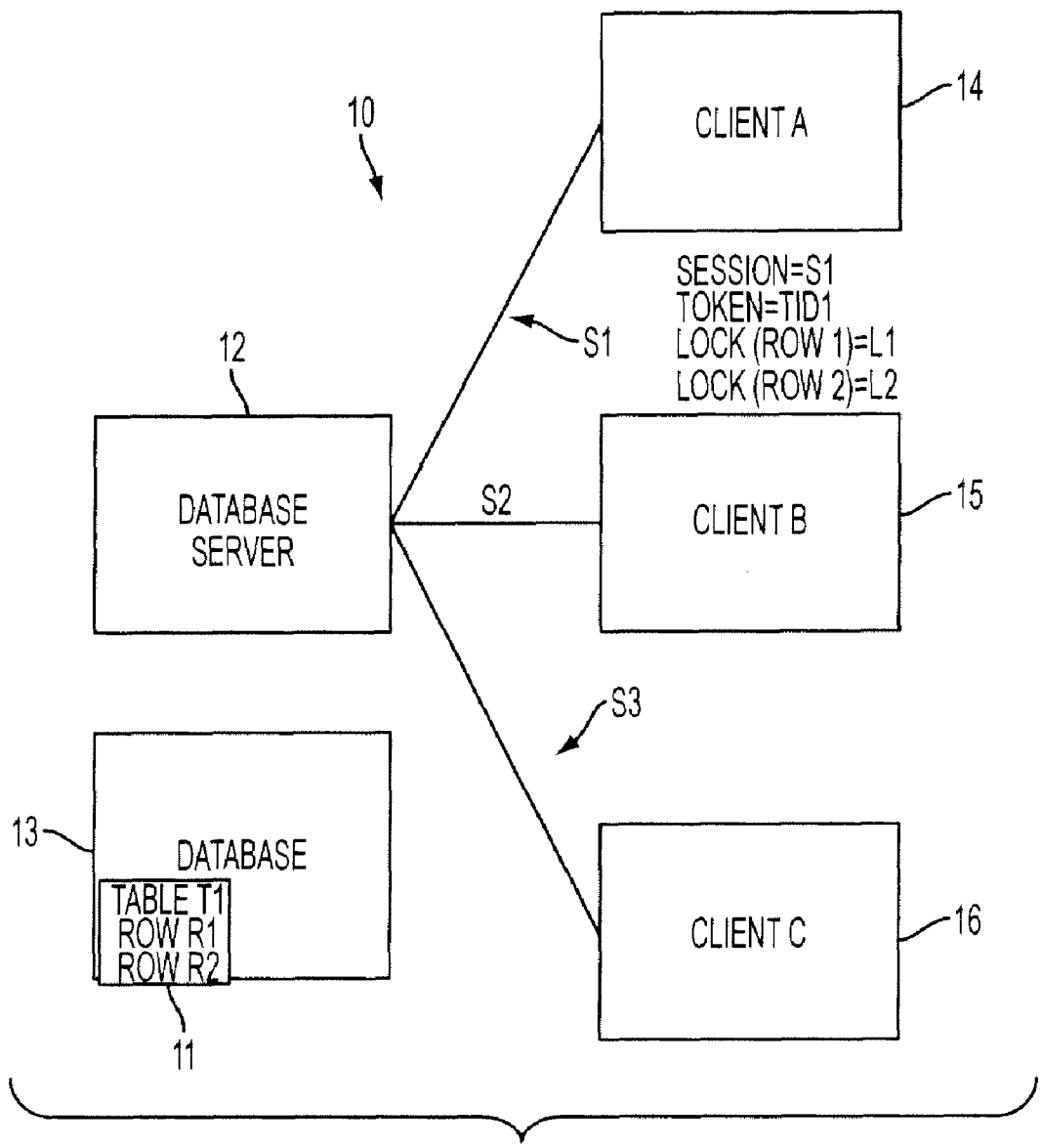
FIG. 1 is a block diagram of one embodiment of a system incorporating features of the disclosed embodiments.

Referring to FIG. 1, a block diagram of one embodiment of a system 10 incorporating features of the disclosed embodiments is illustrated. Although the embodiments disclosed will be described with reference to the embodiments shown in the drawings, it should be understood that the embodiments disclosed can be embodied in many alternate forms of embodiments. In addition, any suitable size.

The disclosed embodiments generally relate to a method for a database to hold update locks on rows of the database for a predetermined period of time across multiple database sessions. These locks, also referred to as exclusive update locks ("EUlocks"), are not the same as and should not be confused with traditional short-duration transactional locks used by database systems. A short-transaction lock is a regular database lock that is held during the scope of the current session to which it is committed. A short transaction can comprise a database manipulation command (insert/update/delete, etc) that is followed by a terminal rollback or commit. The span of a short transaction is within the bounds of a database session and does not span across database session. A short transaction lock is a lock on a database row whose scope of effectiveness is during the duration of a short transaction.

A database session, as that term is used herein, generally represents a stateful connection and operation scope between a client and a database server, in which a client can execute multiple transactions sequentially. When a client has partially completed a transaction TR1 in a session S1, the client can see all the changes made to the database from the session S1. However, no other session can see those changes. Generally, a session S can contain and execute multiple short transactions (ST1, ST2, ST3 . . . ) sequentially.

In the disclosed embodiments, a row can be locked for an extended period of time so that the row, or rows, can be consecutively updated by multiple database sessions during that period of time. Only one session can possess ownership of the long transaction lock of the disclosed embodiments on an instance at any point in time. Only the session having ownership of the long transaction lock can update the locked row. The session can then sequentially hand-off ownership of the locked row to another user session without having to relinquish the lock during the handoff. After the handoff, the destination session, which becomes the owner of the lock can update the row, while the original session which handed off the ownership can no longer update that row. This allows multiple sessions to coordinate sequential handoffs in a specific order in a long transaction without having to relinquish the lock during the long transaction.

The changes made during the course of a long transaction can be made externally visible from time to time by explicitly committing the changes made. The long transaction locking mechanism of the disclosed embodiments can be used to lock various rows of the database, across the span of multiple database sessions, so that changes to the selected rows can be made with out interruption within the context of the same long transaction consistently over the multiple database sessions.

Figure 5:
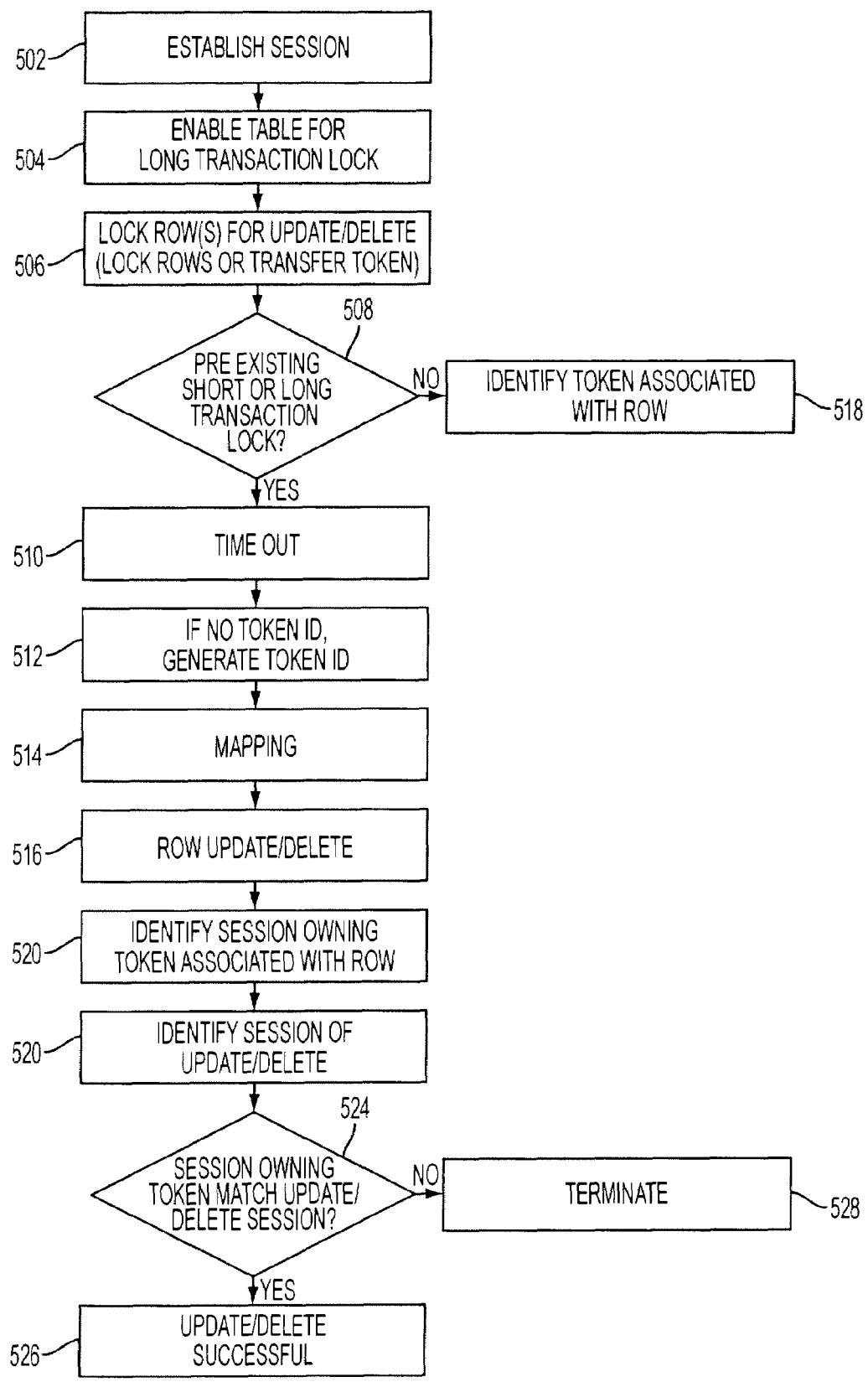
FIG. 5 is a flowchart illustrating one embodiment of a method incorporating features of the disclosed embodiments.

For example, referring to FIG. 1, a user or client 14 may wish to update one or more rows of the database 13. In one embodiment, this update may take place over an Internet connection and can extend for a long period of time, such as in a transaction or project for example. In alternate embodiments, the update of the row(s) can be carried out in any suitable manner. Referring also to FIG. 5, the client 14 of FIG. 1 establishes 502 a database session S1 with the database server 12 to access and update on or more rows R1 of the database 13. The table T1 of the database 13 must be registered 504 for enabling long transaction locks. In one embodiment, a table is registered for enabling long transaction locks on it by generating and installing triggers that perform checks to ensure that only the session which owns the token identifier associated with a row can perform an update/delete on the row. In one aspect, the disclosed embodiments can utilize a token based locking mechanism for long transactions. For example, a table can be registered for long transaction locks by calling the registerFeatureTable( ) API.

If the table T1 is enabled for long transaction locks, the user 14 can select the row(s) that are desired to be changed, and request or invoke 506 a long transaction lock on the selected rows. In one embodiment, this can be achieved from a session by either invoking a lockRows( ) or transferToken( ) API. In alternate embodiments, any suitable means for generating a lock rows request can be utilized. For example, the request to lock the rows can take the form of a "lockrows( )" request and can comprise invoking the lockRows([t1], where_ clause, . . . ) API from the session from where the update is required to be performed. If a token identifier is provided in the lock rows request, then all the rows referred to by the "where" clause will be associated with that token identifier, and that token identifier will be associated with the invoking session identifier.

If it is determined 508 that the requested rows are not previously locked, or a token identifier is not provided in the request to lock rows, the lockRows( ) call, the database server 12 can generate 512 a token identification or authorization (referred to herein as "tokenID"), shown in FIG. 1 as TID1. The generation 512 of a token identification will generally only occur when lock rows request or API is invoked that does not provide a token identifier. In one embodiment, generating a transaction lock on a selected row comprises generating a token identifier and passing the token identifier to the client session.

Referring to FIG. 1, the token is a unique identifier that is sent for example, from the database server 12 to the client 14 where it is stored. The token generally comprises a logical entity that is owned by a single session at any point in time. The token is generated by the database server when a lock rows request is made and is associated with the rows that are locked as a result of the request. A client session, such as session S1 in FIG. 1, is the owner of the lock L1, and only one client session can own the lock L1 for the associated rows at any given point in time. Thus, only the client from the session that owns the token identifier can update the locked row(s).

Only those rows can be long-transaction locked if they are not already long-transaction locked by another database session. Referring to FIG. 5, if it is determined 508 that the rows are already locked at the time of the lock rows request 506, the request 506 will terminate or time out 510.

In FIG. 1, the token is represented as token TID1. The token TID1 represents the lock identifier, for example lockID, on the certain rows it is associated with. As illustrated in FIG. 1, the generated lock L1 is on the row(s) R1 of database 13, and the lock L1, with token TID1, is owned by the session S1 with the client 14. Any update/delete on the locked rows R1 is only allowed to be executed from the session, currently session S1, that is the owner of the lock. Thus, for the example of FIG. 1, the user session S1, now owning the token TID1, can change the rows R1 that are locked.

The lock L1 can remain in effect for a predetermined period of time or until the token TID1 is released by the current session S1. In one embodiment, the client 14 can explicitly release the lock L1 from the session S1. In one embodiment, a lock release is effected by, for example, invoking the unLockRows( ) API. In alternate embodiments, any suitable method can be utilized to explicitly release the lock and unlock the rows.

Once a table is long transaction lock-enabled in accordance with the features of the disclosed embodiments, any rows of that table can be locked for a certain period of time. The long running session that owns/creates the lock for certain rows can update/delete those rows. For example, referring to FIG. 1, if while row R1 is locked by one session S1, some other session, S2, tries to update that row R1, the update will fail and the database server 12 will raise an exception. In one embodiment, a database triggering mechanism is used to check/verify, before the delete/update of a row R1, that the current session S1 has the proper authorization to perform the update/delete. This ensures that only a client session with proper authorization (i.e. the owner of the associated token) can update/delete a row.

While rows R1 are locked by lock L1, sessions other than session S1 can only view the locked rows R1. This viewing by other sessions can include viewing changes to the rows R1 that are made through committed database transactions, as that term is commonly understood.

Figure 6:
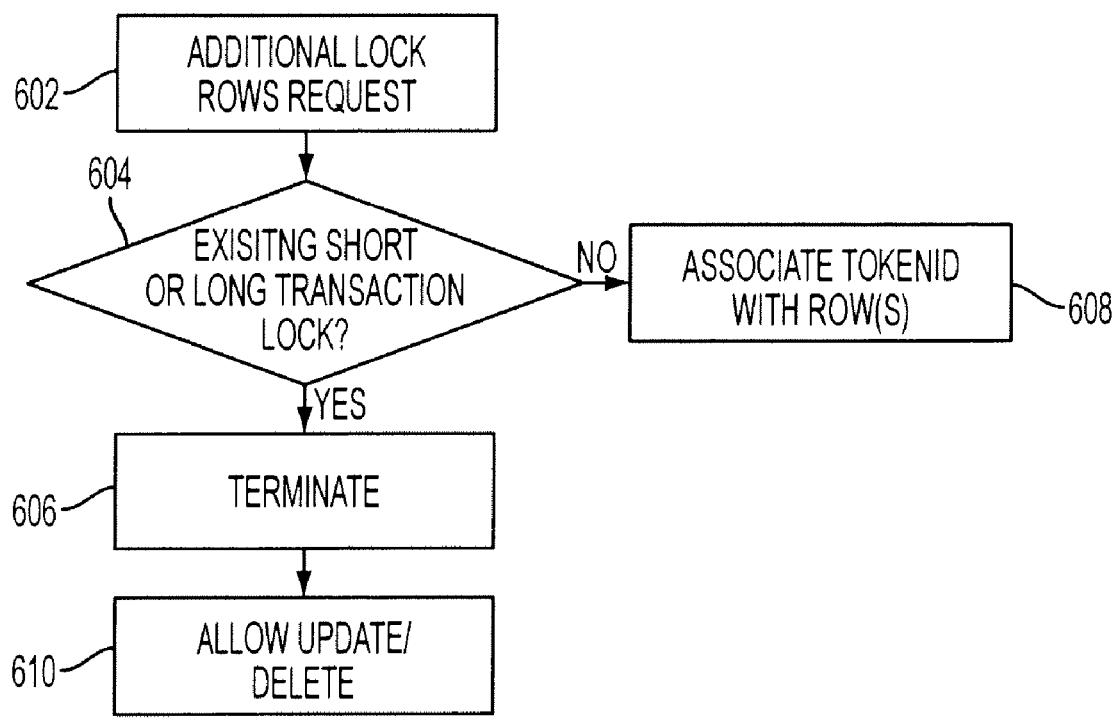
FIG. 6 is a flowchart illustrating one embodiment of a method to lock additional rows in a system incorporating features of the disclosed embodiments.

In one embodiment, additional rows other than R1 of the table T1 shown in FIG. 1 can be locked using the token identifier TID1 associated with session S1. Referring to FIGS. 1 and 6, if for example the client 14 wants to lock another row or rows R2, in addition to rows R1, and associate these additional row(s) R2 with the token TID1, the client 14 can do so by executing another request 602 to lock the additional rows R2 using the previously generated identifier TID1. In one embodiment, this can be accomplished by invoking, for example, lockRows(TID1, where_clause_referring_to_additional_rows, . . . ). In alternate embodiments, any suitable mechanism can be used to expand a scope of an existing lock to encompass additional rows of the database 13. If it is determined 604 that the additional rows R2 are not currently locked by another transaction lock either a short transaction lock or a long transaction lock, the additional rows R2 will now be associated 608 to the previously generated identifier TID1. If it is determined 604 that the row(s) R2 is already locked, the request 602 will terminate or timeout 606. The token that is the subject of the identifier TID1 is still owned by the session S1 and rows R1 remain locked by lock L1.

Referring to FIG. 1, when the lock L2 on the additional rows R2 is set, the identifier TID1 is now associated with locks L1 and L2, and the identifier is still owned by the session S1. From this session S1, the client 14 can perform 610 changes to the rows R1 and R2.

In one embodiment, a client in a different session, for example session S3 shown in FIG. 1, may desire to update the row R1. However, in the current scenario, row R1 is locked by lock L1 that is associated with identifier TID1 that is currently owned by the session S1. In one embodiment, the client 16 in session S3 can request a transfer of the identifier, or token TID1 from session S1 to session S3.

Figure 7:
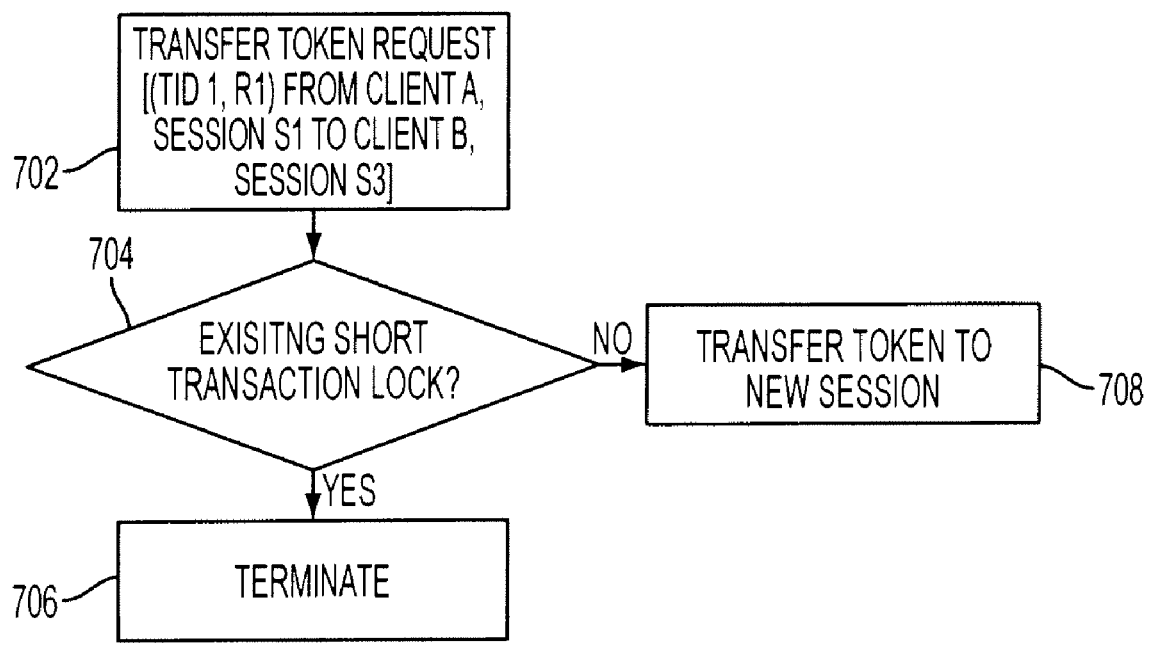
FIG. 7 is a flowchart illustrating one embodiment of a method for transferring a token to a new session in a system incorporating features of the disclosed embodiments.

With reference to FIGS. 1 and 7, client 14, of session S1, owns lock L1 on row R1, which is associated with token TID1. Client 16 in FIG. 1 wants to update the same rows R1 from another database session S3. In one embodiment, client 16, from session S3, requests 702 that the token TID1 be transferred from session S1 to session S3. The transfer token or transfer lock request 702 is made identifying the token TID1 in the transfer request. In one embodiment, this can comprise for example, invoking a transferToken(tokenId) API from a destination session. It is determined 704 whether any of the rows R1 in session S1 have a short transaction lock on them. A short transaction lock could generally mean that session S1 is currently updating the rows R1. If there are no short term transaction locks, the token TID1 will be transferred 708 and the session S3 will now become the owner of the token TID1. After the hand-off of the token to the session S3, the session S3 can update the row, since the session S3 will be identified as the owner of the lock when session S3 attempts to update the row(s) R1. If a short transaction lock exists on row R1, the request 702 will terminate 706.

A successful transfer or sequential hand-off of the token TID1 from session S1 to session S3 marks a release of ownership of the token TID1, and the lock L1, by client 14 to client 16. However, client 16 will not be able to request a transfer of a token without having previously obtained the identifier information for the token, which in this example is TID1. Client 16 needs to obtain this information from the current owner of the lock L1, client 14, before requesting a transfer of the token and lock. Client 14 will hand off this information to the requestor, client 16, when it is ready to release ownership of the token TID1 from its current session, S1.

For example, in one embodiment, the client 14 and the client 16 are or represent the same user/client. The sequential hand-off of the token referred to above allows the clients 14, 16 to maintain the long transaction lock, across multiple database sessions (e.g. S1 and S3). Thus, update operations can be performed consistently over multiple database transactions spanning across multiple database sessions.

Figure 2:
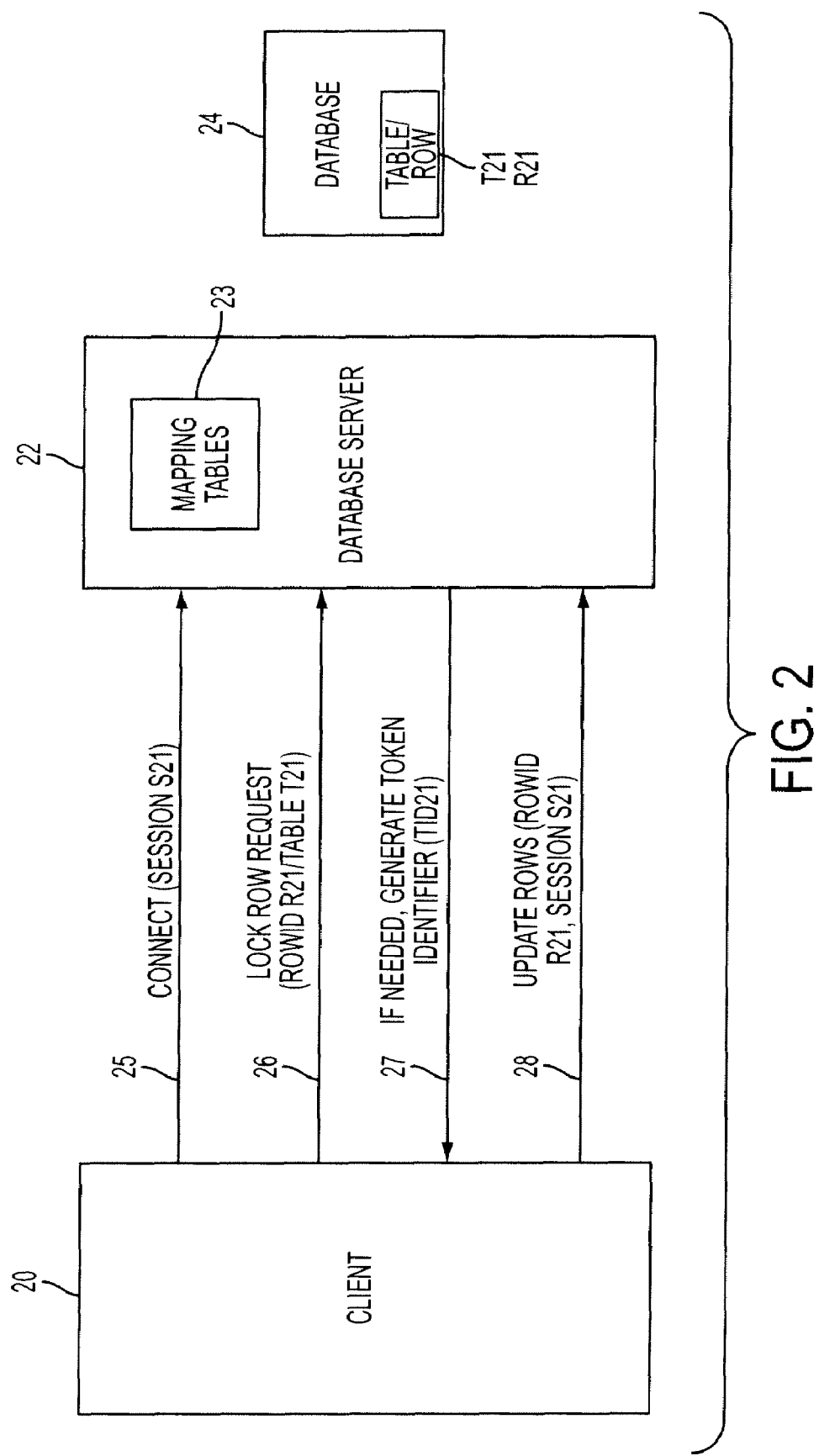
FIG. 2 is a block diagram illustrating one embodiment of a successful long transaction in a system incorporating features of the disclosed embodiments.

Referring to FIG. 2, one example of a successful long transaction lock rows invocation of the disclosed embodiments and transaction is illustrated. Although only one row is updated in the following example, it is a long transaction as a long transaction lock is taken in step 26.

The client 20 establishes a connection 25 to the database server 22 in order to establish a session (sessionId=S21). The connection between the client 20 and the database server 22 can be any suitable communication link over any suitable communication medium. The table T21, in which row R21 is present, must be registered as a long-transaction lock enabled table.

The client 20 needs to register the table T21 as a long-transaction lock enabled table so that appropriate database triggers are generated on the table T21. When a subsequent update/delete is invoked on the rows R21 of the table T21, the triggers are executed to enforce the long transaction locking semantics/constraints. If the table T21 is not registered as a long transaction enabled table, the long transaction locking semantics/constraints will not be enforced since the triggers on the table would not exist.

The client 20 selects the row or rows (rowId=R21) to be updated, in table T21 and requests a long transaction lock 26 on the rows. A token identifier, with tokenId=TID21, will be generated 27 by the database server 22 and returned to the client 20 if the row R21 is not already locked by a short or long transaction lock. It should be noted that a token identifier would only be generated if a token were not identified in the lock rows request. A lock rows request can include a previously generated token identifier, for example when the request is to lock additional rows or a token transfer request. In these cases where the token or identifier already exists, a new token will not be generated.

Referring to FIGS. 2 and 5, when the database server 22 generates the token TID21, the database server 22 also generates 514 certain mappings that can be utilized to enable the transfer of the token across multiple database sessions. In an exemplary session, two mappings can be maintained, a session/token mapping and a row/token mapping:

(SessionId←--→lock TokenId)
(RowId←--→lock TokenId)

For the session S21 of FIG. 2, the database server 22 will generate the session/token mapping (S21, TID21) and the row/token mapping (R21, TID21). These mappings can be stored in the mapping tables 23. These mappings will only be generated 514 if the row R21 does not already have a short or long transaction lock on it. If there is an existing short transaction lock on row R21, or row R21 is associated with another token identifier, such as TID2, an exception will be raised by the database server 22, and the lock rows request 26 will end unsuccessfully 510.

If the lock rows request 26 is successful, the client 20 can update 28 the row R21 from the current session S21. In one embodiment, referring to FIG. 5, when an update or delete is requested 516, the token associated with row R21 is determined 518 from the row/token map entry (R21, TID21). The session that owns the token TID21 is identified 520 from the token session map (S21, TID21). The session in which the update request is being executed is identified 522. If the session that owns the token associated with the R21, as identified 520 from the token/session map matches 524 the session identified 522 as the current session in which the update request is being executed, the update is allowed 526 to continue. This can be considered a successful update. If the sessions do not match, the update/delete is not successful and the request terminates 528.

Figure 3:
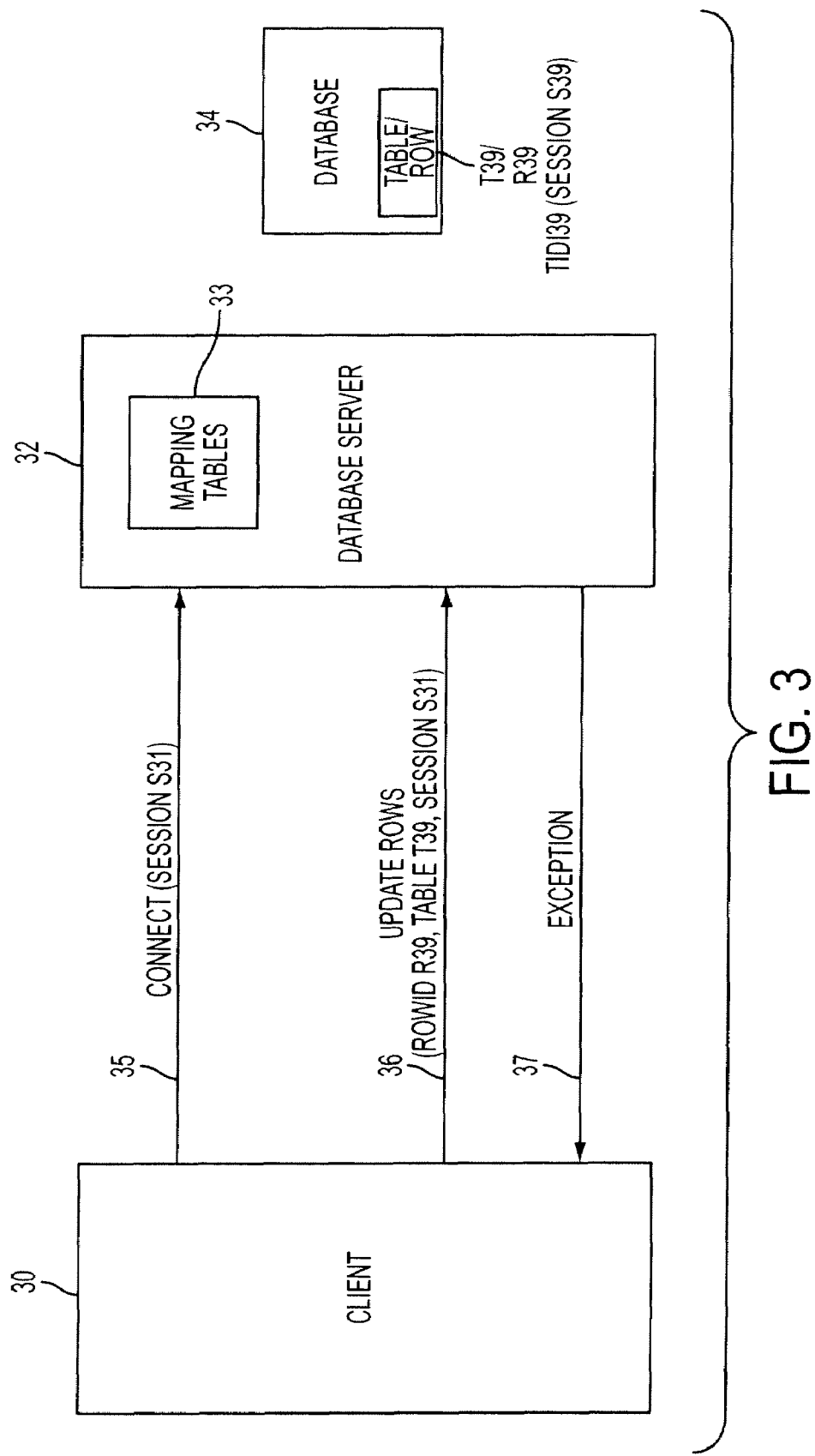
FIG. 3 is a block diagram illustrating one embodiment of an unsuccessful short transaction in a system incorporating features of the disclosed embodiments.

Referring to FIG. 3, a situation is illustrated where an update of a row that is locked by a long transaction lock of the disclosed embodiments is not successful, because the session attempting the update does not own the token associated with the row to be updated. For this example in FIG. 3, the table T39 is a long-transaction lock enabled table and session S39 currently owns the token TID39 associated with row R39. Thus, the respective mappings generated and stored in the mapping table 33 associated with token TID39 are (R39, TID39) and (S39, TID39).

The client 30 establishes 35 a session S31 with database server 32 and attempts to invoke 36 an update/delete on the row that has rowID R39 in table T39, from session S31, by requesting a lock on row R39. Referring to FIGS. 3 and 5, in response to the lock rows request 36, the database server 32 will identify 518 the token associated with row R39. The row/token map table of mapping tables 33 will identify the mapping as (R39, TID39). The database server 32 will then identify 520 the session that owns the token identifier TID39 associated with row R39. In this example, the session/token map table 33 will show the mapping as (S39, TID39). The current session S31 will be identified 522 as the session making or invoking the lock row request 36 for row R39. When the respective session identifiers are compared 524, they will not match. The database server 32 will raise an exception 37 and the lock rows and update request generated by session S31 for row R39 will be unsuccessful and terminate 528.

Figure 4:
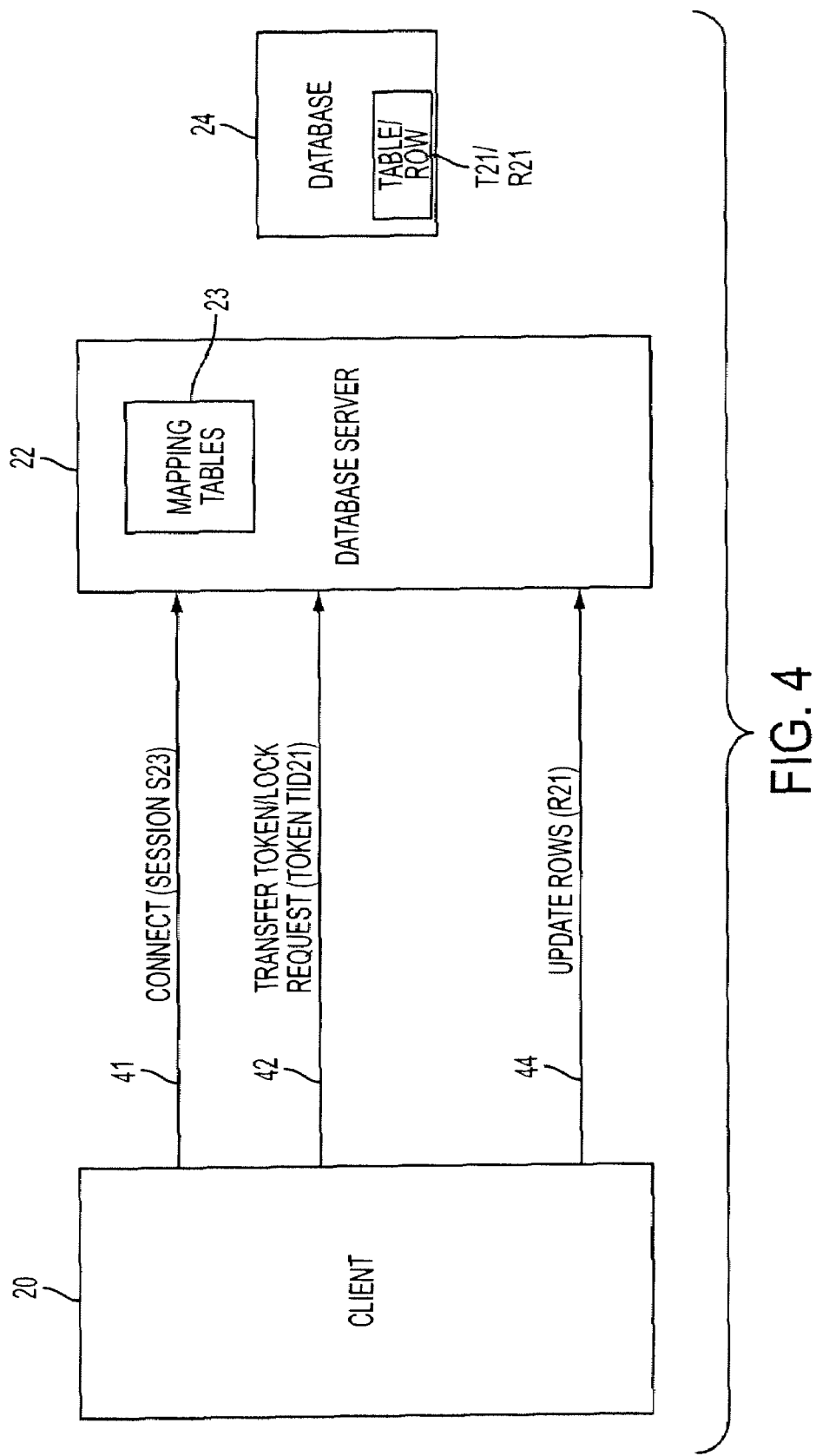
FIG. 4 is a block diagram illustrating one embodiment of a successful lock transfer across multiple sessions in a system incorporating features of the disclosed embodiments.

In one embodiment, the update lock of the disclosed embodiments can be maintained across multiple data sessions. In FIG. 2, session S21 is the owner of the token TID21, which is associated with the RowID R21. Referring to FIG. 4, if client 20 of FIG. 2 would like to update the same row R21 from another database session, session S23, client 20 can do so by transferring the ownership of token TID1 to the new session S23. In one embodiment, client 20, from session S23, requests that the token TID21 be transferred from session S21 to the new session, S23. In one embodiment, this comprises invoking a transferToken( ) API from the new session S23.

As shown in FIG. 4, the client 20, previously in session S21 of FIG. 2, establishes 41 a new session S23 and requests 42 that the token TID21 from session S21 be transferred to session S23. In this situation, since the client is the same in each session, the client knows and is able to identify the token identifier in the request 42. If different clients are involved, then the token identifier would need to be handed-off from one client to another, when ownership is transferred.

Figure 8:
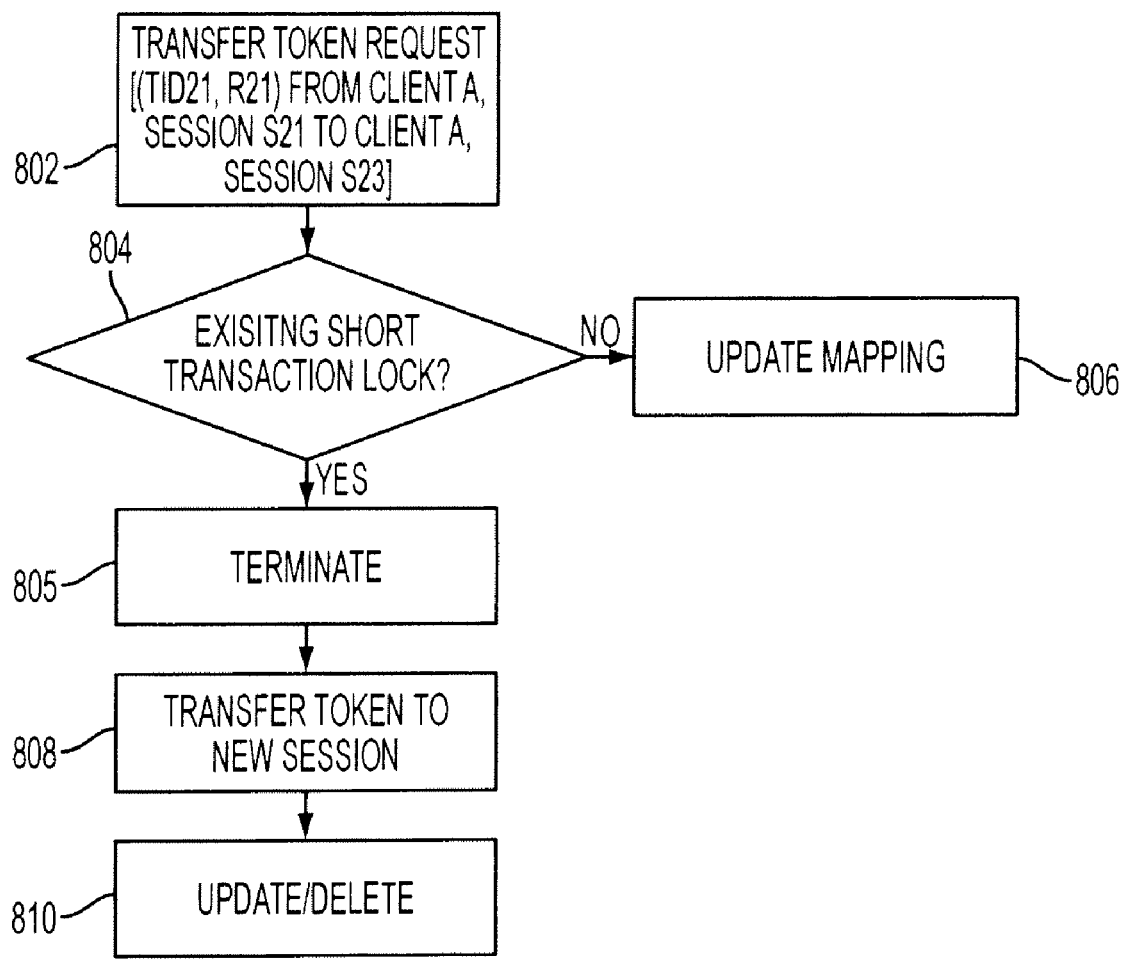
FIG. 8 is a flowchart illustrating one embodiment of a method for transferring a token across multiple sessions in a system incorporating features of the disclosed embodiments.

Since the client 20 has not explicitly released the original lock on row R21, the token TID21 remains associated with the row R21, and prior to the transfer request is owned by session S21. Prior to the transfer token request the row and session mappings are (R21, TID21) and (S21, TID21). Referring also to FIG. 8, while in the new session S23, the client 20, having knowledge of the token identifier TID21, invokes 802 a transfer token request 42, to transfer the token TID21 from session S21 to session S23. If it determined 804 that the row R21 does not have an existing short term lock in place, the database server 22 will change 806 the mapping in the session/token map table 23 from (S21, TID21) to (S23, TID21). The row/token map entry (R21, TID21) created and stored in the database server 22 from the original lock rows request remains unchanged. Thus, the respective mappings are now (R21, TID21) and (S23, TID21). The changes to the token session mapping table will only take place if the row R21 does not have a short transaction lock or regular database update lock on it. If the row R21 does have another lock on it, the database server 22 will raise an exception, and the transfer token request will be terminated 805, after a predetermined timeout period expires.

If the transfer token request is successful, the token ownership now resides 808 in the session S23, and the client 20 will be able to update 810 row R21 in table T21 from session S23. Referring to FIG. 5, when the update rows request 44 of FIG. 4 is executed, the token TID21 associated with rowID R21 will be identified 518, from the row/token map entry (R21, TID21). The session that owns the token TID21 is identified 520 from the session/token session map entry (S23, TID21). The current session executing the update is identified 522 as session S23. Since the session executing the update is determined 524 to match the session identified as owning the token TID21 associated with the row R1, the update is allowed 526 to execute.

Thus, this client 20 can update the row R21 from this new session S23, which is also now the current session, since session S23 is the owner of the token TID21 associated with the rowId R21. A database trigger on the table T21 of row R21 performs this check and allows the update. Clients from any other session would fail to update/delete the row R21, as the other session is not the owner of the token TID21 associated with the row R21. The database trigger on table T21 of row R21 performs this check and will not allow an update. Thus, the lock on a row can be held across multiple database sessions.

In one embodiment, a PL/SQL locking API can be used by PL/SQL and Java clients (via JDBC) to achieve long transaction locking on tables. First, the Java or PLSQL client needs to register a table for enabling long transaction locks by invoking, for example, a registerFeatureTable( ) API, or such other function that will lock-enable that table. Then the Java or PLSQL client needs to invoke lockRows( ), or other such lock rows request, from their session which will generate a token identifier as described above and lock all the rows requested, if they are not locked already by some other database session. A token identifier is associated with each lock and is owned by only one session at a time. The session owning the token identifier can update/delete the rows which are locked by the associated lock. If a token identifier has previously been generated and the client wants to lock some more rows associated with that token, they can do so by invoking lockRows( ) with the previously generated token identifier. Then from this session the user can perform an update/delete of those rows. The locks will remain in effect until the pre-specified expiry time or released by the user. If any other client(s) wants to update these same rows from another database session, the other client can invoke transferToken( ) with the token identifier. A new database session must invoke transferToken( ) prior to attempting any update on a certain row, the row is currently locked by a non-expired tokenId that is owned by another session. The transferToken( ) call will be successful if none of the rows have any short transaction database locks on them. After the update/delete the client can commit the changes to the rows in the database. However the long transaction lock will remain in effect until the client invokes unLockRows( ) explicitly from its session that owns the locks, or the tokenId has expired. The results of intermediate updates during the period a row is locked could be published/committed.

If a row is locked by a regular database lock (i.e. a short transaction lock), then the transfer of ownership of the lock for those rows cannot be carried out until the short transaction lock is released. A short transaction lock is imposed on a row when a database update command is executed or when a "select for update" command is executed on the row, and the short transaction lock remains in effect until a database commit or rollback is done in that session. A row that has a EU lock can also have a short transaction lock. After acquiring a EU lock via the lockRows( ) API, a client can update the row, but not commit the changes for a period of time. This is enforced by executing for example a "select rowId from table where where_clause for update", before taking a transfer ownership of the lock. The taking of the transfer ownership of the lock involves changing the (sessionId, tokenId) mapping from the current session to the destination session. This transferToken( )call will timeout and raise an exception if any of the rows in question are currently under a short transaction lock that prevents transferring the ownership of the lock.

Generally, the long transaction lock remains in effect until removed by the client via unLockRows( ) call, or the token identifier expires. In one embodiment, a timer based implementation waits for a certain pre-specified period of time for the transfer token action, transferToken( ) call, to complete successfully. If the transfer token request does not complete within a certain time-period due to blocking, meaning the rows in question are under a short transaction lock, a time-out occurs and an exception is raised accordingly.

The following are examples of the tables that can be used to store the locking metadata of the light-weight locking model of the disclosed embodiments. The tables are queried/updated by the locking API implementation:

```
// TokenSessionMap stores the Token to Session mapping (N:1).
  create table TokenSessionMap (sessionId varchar2(30),
      tokenId number unique,
      expiryTime timestamp(6), primary key(sessionId, tokenId));
// RowTokenMap stored the TokenId to RowId mapping(1:N)
  create table RowTokenMap (tokenId number references
  TokenSessionMap(tokenId) on delete cascade,
      tableName varchar2(60),
      rpointer ROWID primary key);
// QueryTokenMap stores the Token to table where Clause/filter mapping(1:N)
  create table QueryTokenMap (tokenId number references
  TokenSessionMap(tokenId) on delete cascade,
      tableName varchar2(60),
      tableAlias varchar2(20),
      whereClause varchar2(800));
```

The following are examples of embodiments of the API for the light-weight locking model of the disclosed embodiments:

The RegisterFeatureTable( ) API will allow clients to register, or lock-enable a table whose rows can be locked by the long transaction locking model of the disclosed embodiments.

procedure registerFeatureTable(p_userName IN varchar2, p_tableName IN varchar2)

This lockRows( ) API will allow clients to lock certain rows of interest (referred to, by the where clause) of a lock-enabled table. This API can generate a tokenId that will be associated with the row Ids of the rows that are locked by this call.

```
- function lockRows(p_tableName IN VARCHAR2,=20
      p_tableAlias IN varchar2,=20
      p_whereClause IN varchar2,=20
      p_expiryTime IN number,=20
      p_rowsLocked OUT RowPointerList,=20
      p_rowsNotLocked OUT RowPointerList, // list of
  RowIds
      p_lockAll IN varchar2,=20
      p_auto_commit IN varchar2) return number ; //
  returns token Id
```

The following lockRows( ) API will reuse a tokenId generated earlier, in a prior lock rows request, and associate the tokenID with the rowIds (referred to by the where clause) of the rows that are locked by this call.

```
- function lockRows(p_tokenId number,
      p_tableNameIN VARCHAR2,
      p_tableAlias IN varchar2,
      p_whereClause IN varchar2,
      p_expiryTime IN number,
      p_rowsLocked OUT RowPointerList,
      p_rowsNotLocked OUT RowPointerList,
      p_lockAll IN varchar2,
      p_auto_commit IN varchar2) return number ;
```

This unLockRows( ) API will unlock certain rows (referred to by the where clause) that are locked by a certain tokenId.

```
- procedure unLockRows(p_tokenId number,
        p_tableName IN VARCHAR2,=20
        p_tableAlias IN varchar2,=20
        p_whereClause IN varchar2 ,=20
        p_auto_commit IN varchar2) ;
```

This transferToken( ) API can be invoked from a session which will, in a successful transfer, make it the owner of the tokenId_provided as a parameter. If successful, then from that session, an update/delete can be done on any row associated with that token (p_tokenId).

procedure transferToken (p_tokenId number);

The unRegisterFeatureTable( ) API is used to unRegister a table from being able to be locked, i.e. it will lock-disable a table procedure.

unRegisterFeatureTable(p_userName IN varchar2, p_tableName IN=varchar2);

Parameter Description:

p_tableName: Name of the feature Table, storing feature rows/instances p_userName: db schema in which the feature table defined p_tableAlias: feature table Alias referred to from the where clause/filter condition p_whereClause: filter criteria to specify which feature instances to lock/unlock p_expiryTime: Expiry time of a lock token p_rowsLocked: list of rowIds which are locked p_rowsNotLocked : list of row Ids which are not locked p_lockAll : ALL or SOME which indicates whether to lock all rows or lock some rows referred by the filter criteria ( where clause)

p_auto_commit: 'Y' or 'N'. If 'Y' then do a db commit after the operation p_tokenId: lock token Id (originally generated by the system).

An example of the pseudo code for the different APIs of locking model of the disclosed embodiments is illustrated below:

```
- procedure registerFeatureTable(p_userName IN varchar2,
    p_tableName IN varchar2) {
        for the feature table(refered by p_userName.p_tableName
    define a
            before update/delete trigger to do the following:
            - if to be updated/deleted row has a valid non-expired
    token owned by some other session
                then abort (raise exception)
                else allow the update/delete to go through successfully
```

Once a table is registered as a feature table, the table rows can be locked by the LockRows( ) API. The locked row(s) can only be updated in another session after a transferToken( ) with the appropriate token which was generated/associated during a previous lockRows( ) invocation. An example of a lockRows( ) API is illustrated below:

```
- function lockRows(p_tableName IN VARCHAR2,=20
        p_tableAlias IN varchar2,=20
        p_whereClause IN varchar2,=20
```

```
-continued p_expiryTime IN number,=20
        p_rowsLocked OUT RowPointerList,=20
        p_rowsNotLocked OUT RowPointerList,=20
        p_lockAll IN varchar2,=20
        p_auto_commit IN varchar2) return number) {
```

For each row specified by the whereclause, the p_tableName parameter checks to see if the row has a short transaction lock, or a valid long transaction lock (i.e. a non-expired lock owned by another session). If (p_lockAll=TRUE) then, if it has a short transaction lock, a block is issued, until a timeout expires, upon which an exception is raised if still blocked. If the row has a long transaction lock, there is a rollback and exception raised. If all of the rows do not have long or short transaction lock, then all the rows are selected for update to avoid being modified by any other transaction. A row is inserted into RowTokenMap for each locked row (use a system generated tokenId). End if;

If (p_lockAll=FALSE) then—If it has a short transaction lock then continue with the next row. If it has a long transaction lock then continue with the next row. If the rows do not have long or short transaction lock, then select all the rows for update to avoid being modified by any other transaction, and insert a row into RowTokenMap for each locked row (using a system generated tokenId). End If; A row is inserted in the QueryTokenMap for each whereClause/tableName combination, where the whereClause represents the rows that are actually locked. A row is also inserted in the TokenSessionMap (with the current sessionId, and tokenId).

The tokenId is generated uniquely by the system. If autocommit is true then do commit;

The following generally describes one embodiment of a lockRows( ) API incorporating features of the disclosed embodiments, which takes a previous generated tokenId as a parameter:

```
function lockRows(p_tokenId IN number,
        p_tableNameIN VARCHAR2,
        p_tableAlias IN varchar2,
        p_whereClause IN varchar2,
        p_expiryTime IN number,
        p_rowsLocked OUT RowPointerList,
        p_rowsNotLocked OUT RowPointerList,
        p_lockAll IN varchar2,
        p_auto_commit IN varchar2) return number {
```

For each row specified by the whereclause, the p_tableName parameter checks to see if the row has a short transaction lock, or a valid long transaction lock (i.e. a non-expired lock owned by another session). If (p_lockAll=TRUE) then, if it has a short transaction lock and the request is blocked until a timeout expires. An exception can then be raised if still blocked. If it has a long transaction lock, there is a rollback and an exception is raised. If all rows do not have long or short transaction lock, then all the rows are selected for update to avoid being modified by any other transaction. A row is inserted into RowTokenMap for each locked row using the tokenId passed as a parameter. End if;

If (p_lockAll=FALSE) then, if it has a short transaction lock, continue with the next row. If it has a long transaction lock, then continue with the next row. If the rows do not have long or short transaction lock, then select all the rows for update to avoid being modified by any other transaction. Then insert a row into RowTokenMap for each locked row, using the tokenId provided in the lockRows( ) API parameter. End If;

A row is inserted in the QueryTokenMap for each where-Clause/tableName combination, where the whereClause represents the rows that are actually locked. A row is also inserted in the TokenSessionMap (with the current sessionId, and tokenId).

The tokenId is used as per the input parameter (p_tokenId). If autocommit is true then do commit.

The following describes one example of an unlockRows( ) API incorporating features of the disclosed embodiments:

```
- procedure unLockRows(p_tokenId IN number,
         p_userName IN varchar2,
         p_tableName IN varchar2,
         p_tableAlias IN varchar2,
         p_whereClause IN varchar2 ,
         p_auto_commit IN varchar2) {
```

For each row referred to by the p_tokenId, p_tableName and p_whereClause, the corresponding row(s) are deleted from RowTokenMap, QueryTokenMap. Rows are deleted from the TokenSessionMap where the tokenId in that row does not exist in the RowTokenMap. If autocommit is true then do commit.

The following describes the semantics of an exemplary transferToken( ) API in the locking model of the disclosed embodiments:

Procedure transferToken (p_tokenId number) {. For each tableName, find the whereClause referred to by the p_tokenId in QueryTokenMap [the where clause in the QueryTokenMap represents the rows that the currently locked by the p_tokenId]. All the corresponding rows from table are selected for update. If any of these rows are currently being updated/locked by a database short transaction, then block. Once all the concerned rows are locked (via select for update), then do update TokenSessionMap set sessionId=current_sessionId where tokenId=p_tokenId. From the current session, the before update/delete triggers allow updates/deletes for the rows associated with the p_tokenId.)-commit;

The following describes the semantics of one example of the unRegisterFeatureTable( ) API in the locking model of the disclosed embodiments:

```
- procedure unRegisterFeatureTable(p_userName IN varchar2,
         p_tableName IN= varchar2) {
```

The before update/delete trigger which was installed by the registerFeatureTable function is dropped. This will enable a regular update/delete on the table using the regular database transaction semantics.

Figure 9:
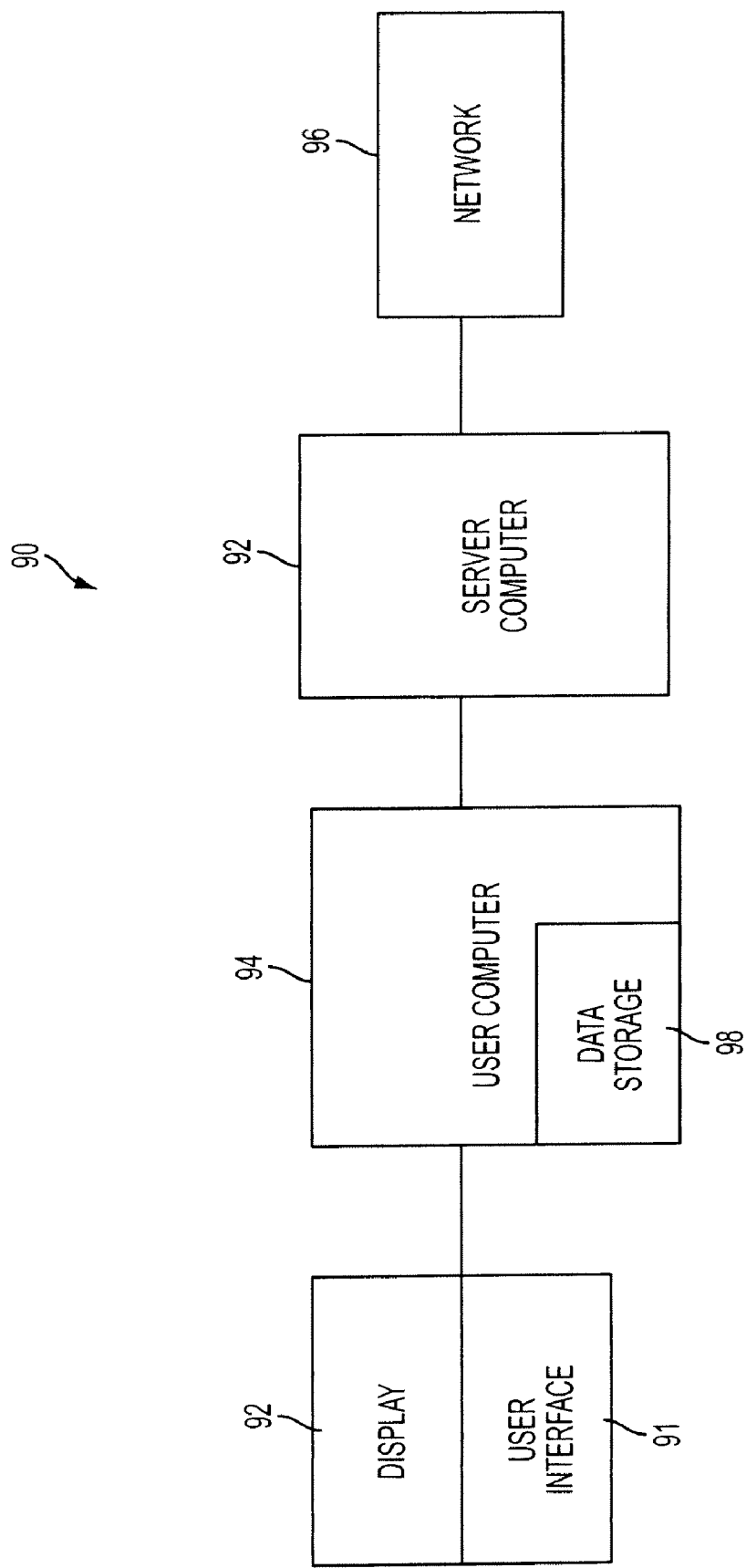
FIG. 9 is a block diagram of one embodiment of an architecture that can be used to practice the disclosed embodiments.

The present invention may also include software and computer programs incorporating the process steps and instructions described above that are executed in different computers. FIG. 9 is a block diagram of one embodiment of a typical apparatus incorporating features of the present invention that may be used to practice the present invention. As shown, a computer system 90 may be linked to another computer system 92, such that the computers 90 and 92 are capable of sending information to each other and receiving information from each other. In one embodiment, computer systems 90 and 92 could include or be connected to a server computer adapted to communicate with a network 94, such as for example, the Internet. Computer systems 90 and 92 can be linked together in any conventional manner including a modem, hard wire connection, or fiber optic link. Generally, information can be made available to both computer systems 90 and 92 using a communication protocol typically sent over a communication channel or through a dial-up connection on ISDN line. Computers 90 and 92 are generally adapted to utilize program storage devices embodying machine readable program source code which is adapted to cause the computers 90 and 92 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 90 and 92 may also include a microprocessor for executing stored programs. Computer 90 may include a data storage device 96 on its program storage device for the storage of information and data. The computer program or software incorporating the processes and method steps incorporating features of the present invention may be stored in one or more computers 90 and 92 on an otherwise conventional program storage device. In one embodiment, computers 90 and 92 may include a user interface 97, and a display interface 98 from which features of the present invention can be accessed. In one embodiment, the user interface and the display interface 98 comprise a single interface device. The user interface 97 and the display interface 98 can be adapted to allow the input of queries and commands to the system, as well as present the results of the commands and queries.

The disclosed embodiment enable any database to hold exclusive update locks on rows for a period of time across multiple database sessions. Given any production database (relational or object-relational), a single table may be "EUlock-enabled". Once a table is lock-enabled, any rows of that table can be locked for a certain period of time. A long running session which owns/creates the lock for certain rows can update/delete those rows. Other sessions may view those rows, including any changes to such rows that the long running session has made through committed database (traditional, short) transactions. However, a session other than the owner of the lock cannot execute an update/delete, or similar transaction, on the rows. While a row is locked by one session, if some other session tries to update that row then it will fail, and the locking model will raise an exception. Additionally, the locking model of the disclosed embodiment will provide a way to transfer ownership (a sequential hand-off) of locks from one session to another session, so that at a future point in time updates/deletes can be performed from another session which owns those locks. This can assure consistency of data since only one session can update a row at a particular point in time. Multiple user sessions can sequentially participate and coordinate updates in a specific order in a long transaction without having to relinquish the lock at any time during the period of the long transaction. A database triggering mechanism is used to check and verify, before the execution of a delete/update of a row, if the current session has the proper authorization to perform the update/delete. This ensures that only a session with proper authorization, i.e. owner of the proper lock, can update/delete a row.

What is claimed is:

1. A method for maintaining a long transaction database lock across multiple database sessions using a computing device, the method comprising:
   determining, in the computing device, if at least one row of a long transaction lock enabled table, identified in a long transaction lock request, is locked by a short or long transaction lock, and if not,
   locking the at least one row with a long transaction lock;
   associating the long transaction lock on the at least one row with a current client session that generated the request; and
   enabling a transfer of the long transaction lock to another client session in response to a lock transfer request from the another client session without releasing the long transaction lock during the transfer of the long transaction lock.

2. The method of claim 1 further comprising:
   determining, in response to the lock transfer request, if the at least one row associated with the long transaction lock is currently locked by a short transaction lock in the current client session; and, if not,
   transferring the long transaction lock from the current client session to the another client session when the another client session is authorized to receive the long transaction lock.

3. The method of claim 2 further comprising determining that the another client session is authorized to receive the long transaction lock by matching the association between the long transaction lock and the current client session with an association identifier included in the lock transfer request.

4. The method of claim 3 further comprising representing the association between the long transaction lock and the current client session as a token that has an identification code, and wherein the association identifier in the lock transfer request is in the form of the token identification code.

5. The method of claim 1 further comprising generating an identifier that identifies the current client session that generated the long transaction lock request as an owner of the long transaction lock on the at least one row.

6. The method of claim 5 further comprising transferring the long transaction lock to another session when, the lock transfer request includes an identifier that substantially matches the identifier that identifies the current client session that generated the long transaction lock request as an owner of the long transaction lock on the at least one row, and the at least one row is not currently locked by a short transaction lock.

7. The method of claim 5 further comprising in response to a request from a second client session for a transfer of the long transaction lock on the at least one row from the current client session to the second client session:
   determining if there is a short transaction lock on the at least one row in the current client session; and if not
   matching an identifier in the lock transfer request with the identifier that identifies the current client session as owner of the long transaction lock; and
   transferring the long transaction lock to the second session when the identifier in the lock transfer request matches the identifier that identifies the current client session as owner of the long transaction lock.

8. The method of claim 7 further comprising changing the association of the identifier from the current session to the second session upon transfer of the lock to the second session.

9. The method of claim 1 further comprising:
   determining if at least one additional row selected to be locked by the long transaction lock is currently locked by a short or long transaction lock, and if not
   locking the at least one additional row with the long transaction lock; and
   associating the at least one additional row with the current client session as the owner of the lock on the at least one additional row.

10. The method of claim 1 further comprising, prior to executing a transaction on the at least one row, verifying that a session executing the transaction has authorization to perform the transaction by matching a session identifier of the session associated with the long transaction lock on the at least one row with a session identifier of the session executing the transaction and allowing the transaction to execute if the session associated with the long transaction lock is the same as the session executing the transaction.

11. The method of claim 1 further comprising:
    storing a row identifier of the at least one row and a lock identifier that associates an owner of the long transaction lock with the long transaction lock in a row/token mapping table; and
    storing a current client session identifier that associates the current session as a current owner of the lock and the lock identifier in a session/token mapping table.

12. The method of claim 11 further comprising, in conjunction with the transfer of the long transaction lock, updating the session/token mapping table to associate the another session as the current owner of the lock.

13. The method of claim 12 further comprising in response to an update row request on the at least one row:
    identifying, from the row/token table, a lock identifier associated with the at least one row in the update row request;
    identifying, from the session/token table, a session that is associated with the lock identifier identified in the row/token table;
    determining if the session identified from the session/token table matches a session associated with the update row request; and if there is a match,
    executing the update row request on the at least one row.

14. The method of claim 1 further comprising generating a token identifier in conjunction with locking the at least one row, the token identifier identifying the current client session as owner of the long transaction lock on the at least one row, and storing the token identifier in the current client session.

15. The method of claim 14 further comprising transferring the long transaction lock on the at least one row to another session by transferring the token identifying the current session as the owner of the long transaction lock to a destination session in response to a lock transfer request from the destination session that includes a reference to the token identifier.

16. The method of claim 14 further comprising transferring ownership of the long transaction lock from the current session to another session by:
    determining if rows identified in a lock transfer request from the another session are locked by a short transaction lock; and if not
    matching a token identifier provided in the lock transfer request with the token identifier that identifies the current session as owner of the lock, and if they match,
    transferring the lock to the another session and changing the association of the token identifier that identifies the current session as owner of the lock to reflect the another session as owner of the lock.

17. The method of claim 1 wherein the current client session and the another client session are different clients.

18. A method for transferring a long transaction database lock across multiple database sessions in a computing device comprising:
generating a long transaction lock row request for a transfer of a lock from a first session to the second session in the computing device;
determining if there is a short transaction lock on a row of the long transaction lock row request in the first session; and, if not,
transferring the long transaction lock from the first session to the second session if the second session is authorized to receive the long transaction lock.

19. The method of claim 18 further comprising not releasing the long transaction lock during the transfer from the first session to the second session.

20. The method of claim 18 further comprising, prior to transferring the long transaction lock, determining that an identifier provided in the transfer request corresponds to an identifier associated with a current owner of the long transaction lock.

21. A lock control method in a database system comprising:
registering a table for enabling long duration transaction locks in a computing device;
associating, in the computing device, all rows in a lock rows request from a database session where the transaction is to be performed with a token identifier, and associating the token identifier with the database session to identify the database session as owner of a long transaction lock of the rows;
locking the rows associated with the lock rows request using the computing device if the rows are not already locked by another database session;
allowing a transaction to be executed on the locked rows only by a session associated with the token identifier and
determining that another database session is authorized to request a transfer of the token identifier from the current session to the another session;
providing an identification of the token identifier to the another session;
receiving a lock transfer request from the other session that includes the identification;
determining that the rows associated with the long transaction lock in the current session are not locked by a short transaction lock; and
transferring the long transaction lock to the another session and associating the token identifier with the another session.

22. The method of claim 21 further comprising:
requesting additional rows to be locked and associated with the token identifier; and
if the additional rows are not already locked by a short or long transaction lock, long transaction locking the additional rows and associating the token identifier with the additional locked rows.

23. The method of claim 21 further comprising, prior to executing a transaction on a row locked by a long transaction lock, verifying that a session associated with a transaction request is authorized to perform the transaction by:
comparing an identifier associated with a row in the transaction request with a session identified by the identifier associated with the row; and
executing the transaction if the session identified by the identifier associated with the row matches the session associated with the transaction request.

24. A computer program product comprising:
a computer useable medium having computer readable code means embodied therein for causing a computer to maintain a long transaction database lock across multiple database sessions, the computer readable code means in the computer program product comprising:
computer readable program code means for causing a computer to determine if at least one row of a long transaction lock enabled table, identified in a long transaction lock request, is locked by a short or long transaction lock, and if not;
computer readable program code means for causing a computer to lock the at least one row with a long transaction lock;
computer readable program code means for causing a computer to associate the long transaction lock on the at least one row with a current client session that generated the request; and
computer readable program code means for causing a computer to enable a transfer of the long transaction lock to another client session in response to a lock transfer request from the another client session, without releasing the long transaction lock during the transfer of the long transaction lock.

25. The computer readable program code means of claim 24 further comprising:
computer readable program code means for causing a computer to determine, in response to the lock transfer request, if the at least one row associated with the long transaction lock is currently locked by a short transaction lock in the current client session; and, if not
computer readable program code means for causing a computer to transfer the long transaction lock from the current client session to the another client session when the another client session is authorized to receive the long transaction lock.

26. An article of manufacture comprising:
a computer useable medium having computer readable code means embodied therein for causing a computer to maintain a long transaction database lock across multiple database sessions, the computer readable code means in the computer program product comprising:
computer readable program code means for causing a computer to determine if at least one row of a long transaction lock enabled table, identified in a long transaction lock request, is locked by a short or long transaction lock, and if not;
computer readable program code means for causing a computer to lock the at least one row with a long transaction lock;
computer readable program code means for causing a computer to associate the long transaction lock on the at least one row with a current client session that generated the request; and
computer readable program code means for causing a computer to enable a transfer of the long transaction lock to another client session in response to a lock transfer request from the another client session, without releasing the long transaction lock during the transfer of the long transaction lock.

27. The article of manufacture of claim 26 further comprising:
computer readable program code means for causing a computer to determine, in response to the lock transfer request, if the at least one row associated with the long transaction lock is currently locked by a short transaction lock in the current client session; and, if not computer readable program code means for causing a computer to transfer the long transaction lock from the current client session to the another client session when the another client session is authorized to receive the long transaction lock.

* * * * *

UNITED STATES PATENT AND TRADEMARK OFFICE
CERTIFICATE OF CORRECTION

PATENT NO.         : 7,640,242 B2
APPLICATION NO.    : 11/388310
DATED              : December 29, 2009
INVENTOR(S)        : Raja Chatterjee et al.

It is certified that error appears in the above-identified patent and that said Letters Patent is hereby corrected as shown below:

On sheet 5 of 9, in Figure 5, Ref. Numeral 520, line 1, below "Reference Numeral 520" delete "520" and insert -- 522 --, therefor.

On sheet 6 of 9, in Figure 6, Ref. Numeral 604, line 1, delete "EXISITNG" and insert -- EXISTING --, therefor.

On sheet 7 of 9, in Figure 7, Ref. Numeral 704, line 1, delete "EXISITNG" and insert -- EXISTING --, therefor.

On sheet 8 of 9, in Figure 7, Ref. Numeral 804, line 1, delete "EXISITNG" and insert -- EXISTING --, therefor.

In column 11, line 48, delete "refered" and insert -- referred --, therefor.

Signed and Sealed this

Fourteenth Day of September, 2010

David J. Kappos
*Director of the United States Patent and Trademark Office*